Figure 1:
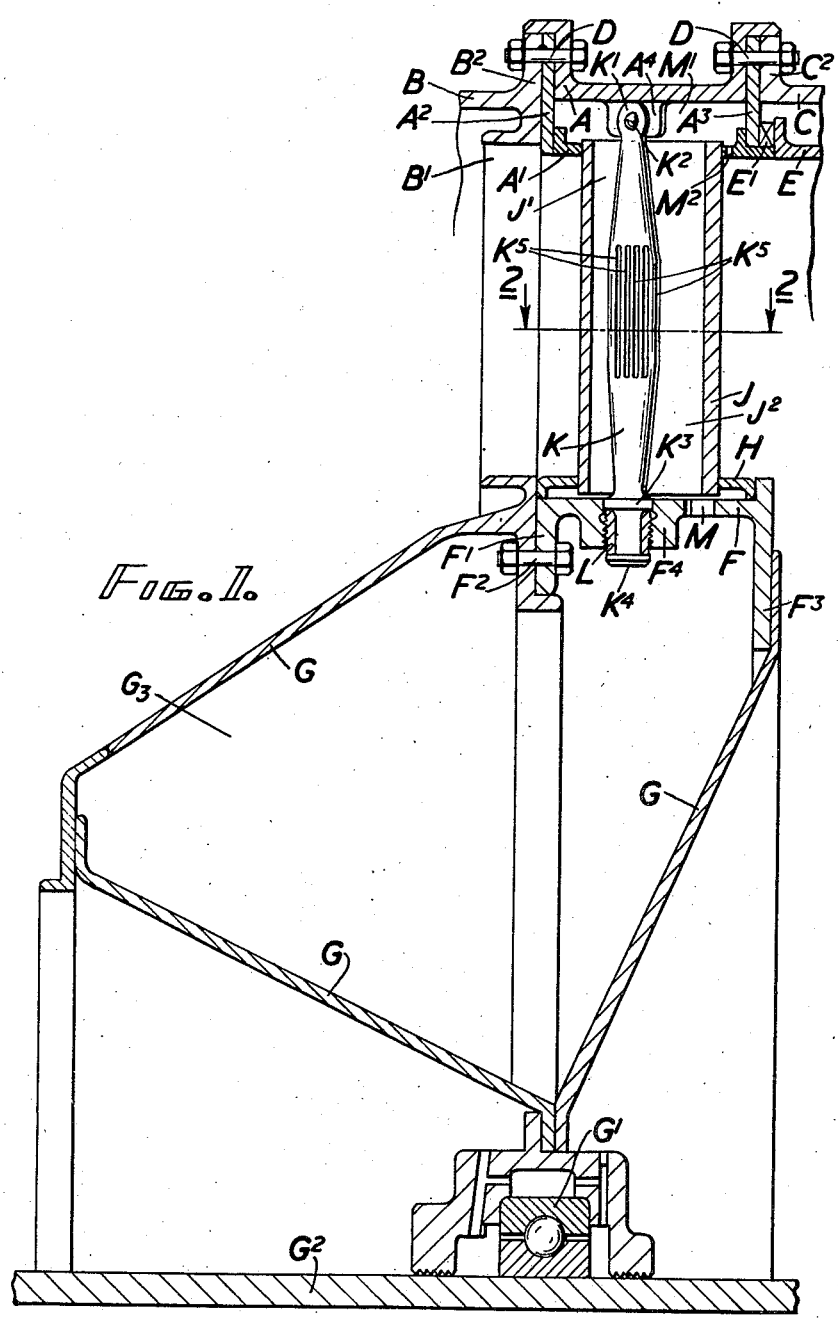

Sept. 24, 1957  F. B. HALFORD ET AL  2,807,433
STATIONARY BLADE RINGS OF AXIAL FLOW
TURBINES OR COMPRESSORS
Filed Dec. 11 1953  2 Sheets-Sheet 2

INVENTORS
FRANK B. HALFORD,
GEORGE F. CLARKE &
ALEXANDER W. E. BARRATT.
BY
Holcombe, Wetherill & Brisebois ATTORNEYS

United States Patent Office 2,807,433
Patented Sept. 24, 1957

2,807,433

STATIONARY BLADE RINGS OF AXIAL FLOW TURBINES OR COMPRESSORS

Frank Bernard Halford, Edgware, George Frederick Clarke, Stanmore, and Alexander William Edward Barratt, London, England, assignors to The De Havilland Engine Company Limited, Edgware, England, a British company Application December 11, 1953, Serial No. 397,751

9 Claims. (Cl. 253—39.1)

This invention relates to stationary blade ring assemblies of axial flow turbines or compressors, the term "blade ring assembly" being used to denote a ring of spaced blades, each of which extends across an annular gas passage between inner and outer circumferential walls, and the annular structure supporting the ends of the blades. The invention is particularly applicable to the so-called nozzle rings of axial flow turbines, that is to say to the stationary blade rings by which the hot gases are directed on to the rotary blade rings of such turbines. The invention is also applicable however, to the stator blade rings of axial flow compressors and in the case of multi-stage turbines or compressors may be applied to any one or more of the stationary blade rings.

An object of the invention is to provide an improved construction of stationary blade ring assembly which will meet to a satisfactory degree the constructional problems involved in such blade rings and enable substantial stresses to be transmitted through the assembly between the parts between which the blades extend, for example between an inner structure carrying bearings supporting a rotor and an outer structure to which are connected the supporting mountings for the whole unit.

A stationary blade ring assembly of an axial flow turbine or compressor according to the present invention comprises co-axial outer and inner blade-supporting rings, hollow blades extending between and supported at their outer and inner ends respectively from the outer and inner supporting rings in a manner permitting limited freedom of movement of each blade relatively to at least one of such supporting rings in the direction of the length of the blade, and links extending through the hollow blades or through an appropriate proportion of them and each connected at its ends respectively to the outer and inner supporting rings so as to maintain the rings approximately concentric with one another.

Thus, the inner and outer blade-supporting rings are connected by the links without interfering in any way with the gas flow through the blade ring assembly. Moreover it will be seen that the links can form a connection between the inner and outer blade-supporting rings of considerable rigidity and strength so that, if, as will usually be the case, the inner blade-supporting ring is rigid with an inner structure carrying a bearing or bearings for the support of the turbine or compressor rotor while the outer blade-supporting ring is rigid with an outer structure or casing including mountings by which the whole unit is supported, the blade ring assembly can readily transmit the required loads from the bearing or bearings to the engine mountings.

Preferably one end of each link, conveniently the outer end, is pivotally connected to its supporting ring while the other end is secured to its supporting ring by a screw-threaded member, hereinafter called the tensioning member, so arranged that a desired degree of initial tension or compression can be set up in the links during assembly.

If desired, each link may fit closely between opposite sides of its associated hollow blade so as to tend to resist "panting" of the blade, i. e., movement of the opposite sides of the blade towards and away from one another under the influence of gas pressure thereon. Moreover in such an arrangement, each link may have an over all cross section such that substantial areas of opposite sides of it engage corresponding areas of the inner surfaces of opposite sides of the hollow blade or the link might even be formed so as substantially to fill the interior of this hollow blade. In either case the link may be provided with one or more grooves in the surfaces which engage the interior surfaces of the blade to provide cooling air passages in association with means by which cooling air can be caused to flow through such passages. Such grooves might extend in the direction of the length of the blade so that the cooling air could flow in a substantially straight path from end to end of the blade or might extend transversely of the length of the blade so as to extend between two chambers disposed respectively adjacent to the leading and trailing edges of the blade in which event cooling air would be caused to flow into one of these chambers and be permitted to escape from the other.

Figure 2:
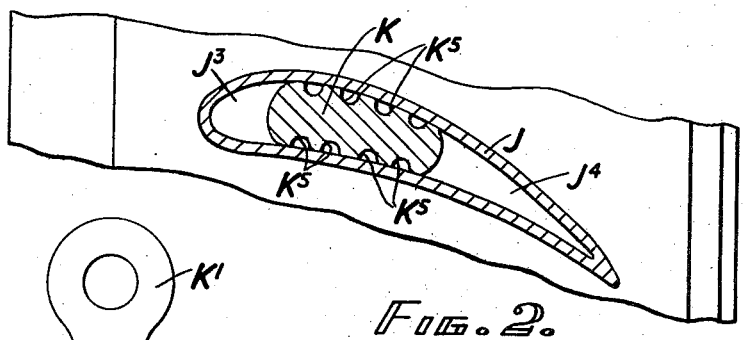
Figure 4:
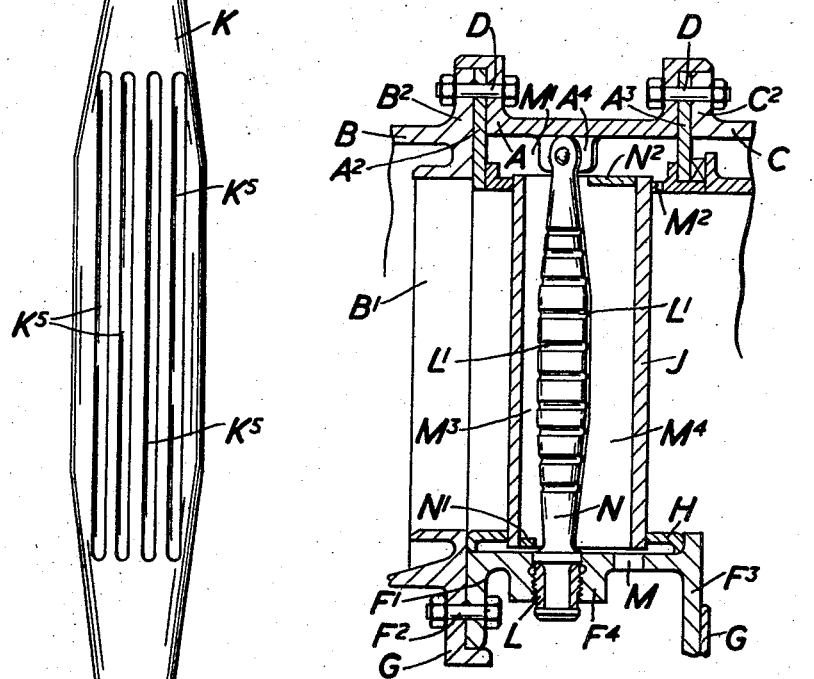
Figure 3:
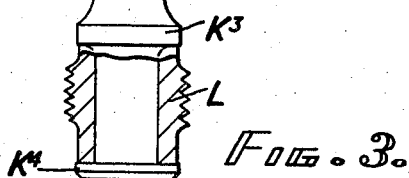

The details of construction of arrangements according to the invention may vary widely but one construction according to the invention as applied to the nozzle ring of the turbine of a gas turbine unit, and a modification thereof, are illustrated in the accompanying drawings in which:

Figure 1 is a sectional view of the nozzle ring and associated parts in a plane containing the axis of the blade ring, the illustration being in the form of a half section for convenience in showing the parts on an adequate scale, Figure 2 is a cross section on an enlarged scale on the line 2—2 of Figure 1, Figure 3 is an enlarged side view of one of the links employed in the construction shown in Figures 1 and 2 and Figure 4 is a partial sectional view on the same plane as Fig. 1 showing a modification of the arrangement shown in Figures 1, 2 and 3.

In the construction shown in Figures 1, 2 and 3, the nozzle ring assembly comprises an outer blade supporting ring comprising an outer annular part, shown generally at A, forming part of the main outer structure of the turbine unit and interposed axially between a casing B by which the outlet ends of combustion chambers are to be supported in known manner within flanged openings, one of which is indicated at $B^1$, and an outer casing C of the turbine, the outer blade supporting ring A being connected to the casings B and C by a series of bolts D passing through flanges $B^2$, $C^2$ respectively on the casings B and C and flanges on the ring part A as shown so that the ring part A constitutes in effect a part of the outer structure of the turbine unit.

In addition to the ring part A the outer supporting ring assembly comprises an inner cylindrical part $A^1$ located between and supportd by two flat locating plates $A^2$, $A^3$, the outer circumferential parts of which are clamped by the bolts D between the flanges $B^2$ and $C^2$ as shown. Formed in the part $A^1$ is a series of slots each of approximately the contour of the external cross section of the outer end of one of the blades to be supported. The ring part A has moreover formed on and projecting radially inwards from its inner face a series of split lugs $A^4$ corresponding in number to the number of blades in the blade ring, while one end face of the ring part $A^1$ may, as shown, constitute a locating face for one end of a hollow shroud ring E for the first ring of rotor blades of the turbine, the shroud ring and the adjacent face of the plate $A^3$ being provided for example with interengaging radial splines $E^1$ which allow for free radial expansion and contraction of the shroud ring relatively to the plate $A^3$.

The inner blade supporting ring comprises an inner part F having a flange $F^1$ at one end which is rigidly secured by bolts $F^2$ to the main inner structure G of the turbine and a flange $F^3$ which is also secured to this main inner structure, which main inner structure G carries bearings, as indicated at $G^1$ for the shaft $G^2$ or the equivalent of the rotor assembly of the turbine unit. Formed on the inner part F of the inner blade supporting ring are a series of bosses $F^4$ equal in number to the number of blades in the blade ring and each having a radial screwthreaded bore. The inner part F of the inner blade supporting ring is radially surrounded by an outer part H of shallow channel cross section the axially extending portion of which is formed with a series of slots of approximately the contour of the external cross section of the inner ends of the blades to be supported, each slot lying opposite one of the bosses $F^4$.

Extending between the inner and outer blade supporting rings is a series of hollow blades one of which is shown at J. The outer end of each blade J lies and makes a sliding fit within one of the slots in the part $A^1$ while its inner end lies and makes a sliding fit within one of the slots in the part H. Passing through each hollow blade is a link K the outer end of which is formed with an eye $K^1$ which lies in a slot in the appropriate split lug $A^4$ and is connected to that lug by a pivot pin $K^2$ while its inner end is provided as shown with two flange like abutments $K^3$, $K^4$ between which lies and is rotatable an externally screwthreaded sleeve L engaging the screwthread in the bore of the boss F so that by rotating the sleeve L the link K can be placed initially in any desired degree of tension or compression.

The pivotal axis of each of the pins $K^2$ may advantageously be inclined to the plane passing through the pin and containing the axis of the blade ring.

As shown most clearly in Figure 2 the central portion of each of the links K fits closely within that part of its blade J which lies adjacent to the centre of the width of the blade so as to act as a strut between the sides of the blade to prevent repeated movement of the opposite sides of the blade towards and away from one another under the influence of fluctuating gas pressure thereon, known as "panting." Moreover the faces of each link which engage the sides of the blade are formed with a series of grooves as shown at $K^5$ forming air passages between the link and the sides of the blade which are open at their ends into the spaces $J^1$, $J^2$ within the end portions of the blade. The inner end of each hollow blade J communicates through passages, one of which is indicated at M, with a space $G^3$ to which cooling air is delivered in known manner; while the annular space $M^1$, into which the outer ends of the blades J open, is provided with one or more air outlet passages $M^2$ so that cooling air can pass continuously through the chambers $J^3$, $J^4$ in the hollow blades J into which the links K divide the space extending from their inner to their outer ends, and through the grooves or passages $K^5$ between the walls of the blades and their links K.

In the modified construction shown in Figure 4 the construction and arrangement of the parts is in general similar to that shown in Figures 1, 2 and 3 except that instead of links K constructed with longitudinal grooves, links of the form shown at N are employed each of these links having transverse grooves $L^1$ while the chambers $M^3$, $M^4$ lying respectively adjacent to the leading and trailing edges of each blade J into which the link N divides the interior of the blade, have associated therewith respectively a plate $N^1$ which closes the inner end of the leading edge chamber $M^3$ and a plate $N^2$ which closes the outer end of the trailing edge chamber $M^4$ so that air which enters the trailing edge chamber at its inner end, traverses the grooves $L^1$ in the link N and escapes from the outer end of the leading edge chamber $M^3$ into the annular chamber $M^1$ and hence through the outlets $M^2$.

It will be apparent that in constructions according to the invention the links K or N form a strong and rigid connection between the inner and outer blade supporting rings A and F, and can thus readily transmit loads between the outer structure of the turbine unit to which the main supporting mountings will be connected, and the bearing or bearings such as $G^1$, supporting the rotor, while the blades J themselves are free to expand and contract relatively to the supporting rings. Moreover, since the blades have to perform substantially only their function of guide blades for fluid while the links perform the entirely separate function of connecting the inner and outer blade supporting rings, the links and the blades can each be made of a material suited to the particular function it has to perform. For example the blade material can be selected for its heat-resisting properties while the link material can be selected almost entirely for its strength at moderate temperatures.

It will also be understood that the invention may be applied to "twisted" as well as to straight blades.

What we claim as our invention and desire to secure by Letters Patent is:

1. An axial flow turbine or compressor comprising co-axial outer and inner stationary blade supporting ring assemblies arranged one within the other, hollow blades extending between and supported at their outer and inner ends, respectively, from the outer and inner supporting ring assemblies by sliding engagement therewith permitting limited freedom of movement of each blade relatively to at least one of such supporting ring assemblies in the direction of the length of the blade, and links extending through a substantial number of the hollow blades each of which links is severally connected at its outer and inner ends to the outer and inner supporting ring assemblies by a radially adjustable tensioning member and a non-extensible joint member respectively, which tensioning members are adjusted with respect to the ring assemblies between which said links are thereby connected to place said links under longitudinal stress, thereby connecting said supporting ring assemblies substantially rigidly to one another in approximately concentric relationship.

2. An axial flow turbine or compressor as claimed in claim 1 in which the radially adjustable tensioning member at the outer end of each link comprises a screw threaded element engaging a threaded element of the ring and is under initial strain produced by rotation of one of said threaded elements with respect to the other during assembly.

3. An axial flow turbine or compressor as claimed in claim 1 in which an intermediate portion of each link fits closely between and against opposite sides of its associated hollow blade and tends to resist "panting" of the blade.

4. An axial flow turbine or compressor as claimed in claim 3 in which the intermediate portion of each link has a transverse cross section such that opposite faces of the link engage the inner faces of the two sides of the hollow blade over substantial areas.

5. An axial flow turbine or compressor as claimed in claim 4 in which one or more grooves are formed in the surfaces of each link which engage the inner surfaces of its associated hollow blade to provide cooling passages between the link and blade.

6. An axial flow turbine or compressor as claimed in claim 5 in which the groove or grooves extend longitudinally of the link and blade and are open at their ends so that when cooling medium is introduced at one end of the interior of the blade a portion of said medium will flow through the grooves endwise of the blade.

7. An axial flow turbine or compressor as claimed in claim 1 in which intermediate portion of each link fits closely between and engages against opposite sides of its associated hollow blade and tends to resist "panting" of the blade.

8. An axial flow turbine or compressor as claimed in claim 1 wherein the chordal length of each link is less than the chordal length of the interior of the hollow blades and in which an intermediate portion of each link fits closely between and engages against opposite sides of its associated hollow blade, thus separating the space within the blade into chambers extending lengthwise of the blade adjacent to the leading and trailing edges thereof respectively, and one or more grooves are formed in the surfaces of the link which engage the inner surfaces of the blade, such grooves extending transversely of the length of the blade between said chambers and connecting one with the other, the inner and outer supporting ring assemblies each providing an annular chamber with which the two chambers in each hollow blade respectively communicate one at its inner end and the other at its outer end, said annular chambers communicating with passages for the flow of cooling medium whereby a cooling medium may be admitted into one of these chambers and permitted to escape from the other chamber after passing through said grooves.

9. An axial flow turbine or compressor comprising co-axial outer and inner stationary blade supporting ring assemblies each including an outer annular part and an inner annular part, hollow blades extending approximately radially between and supported at their outer and inner ends respectively by the inner annular part of the outer supporting ring assembly and the outer annular part of the inner supporting ring assembly, said blades being supported at each end by independent means at least one of which permits limited freedom of movement of the blade relatively to at least one of said supporting ring assemblies in a direction lengthwise of the blade, and links extending through at least a substantial number of said hollow blades and each connected at its ends to the outer annular part of the outer supporting ring assembly and to the inner annular part of the inner supporting ring assembly by a pivot connection at one end and a rigid connection at the other end having provision for adjustment lengthwise thereof thus placing the link in longitudinal stress, thereby connecting the inner and outer supporting ring assemblies rigidly to one another in approximately concentric relationship while permitting limited expansion and contraction of said blades.

References Cited in the file of this patent
UNITED STATES PATENTS 2,622,843  Williams _____ Dec. 23, 1952